US012415099B2

(12) United States Patent
Thompson et al.

(10) Patent No.: US 12,415,099 B2
(45) Date of Patent: Sep. 16, 2025

(54) BREATHING APPARATUS AND METHOD OF COMMUNICATING USING BREATHING APPARATUS

(71) Applicant: 3M INNOVATIVE PROPERTIES COMPANY, St. Paul, MN (US)

(72) Inventors: Darin K. Thompson, Huntersville, NC (US); Jeremy V. Barbee, Oakboro, NC (US); Eric J. Bassani, Denver, NC (US); Robert Heise, Calgary (CA); Michael J. Z. Norton, Alberta (CA)

(73) Assignee: 3M Innovative Properties Company, St. Paul, MN (US)

( * ) Notice: Subject to any disclaimer, the term of this patent is extended or adjusted under 35 U.S.C. 154(b) by 330 days.

(21) Appl. No.: 18/004,154

(22) PCT Filed: Jun. 21, 2021

(86) PCT No.: PCT/IB2021/055444

§ 371 (c)(1),
(2) Date: Jan. 3, 2023

(87) PCT Pub. No.: WO2022/009008

PCT Pub. Date: Jan. 13, 2022

(65) Prior Publication Data

US 2024/0024709 A1 Jan. 25, 2024

Related U.S. Application Data

(60) Provisional application No. 63/050,194, filed on Jul. 10, 2020.

(51) Int. Cl.

| | |
|---|---|
| ***A62B 18/08*** | (2006.01) |
| ***G10L 21/0216*** | (2013.01) |
| ***G10L 21/0264*** | (2013.01) |

(52) U.S. Cl.
CPC .......... *A62B 18/08* (2013.01); *G10L 21/0216* (2013.01); *G10L 21/0264* (2013.01)

(58) Field of Classification Search
None
See application file for complete search history.

(56) References Cited

U.S. PATENT DOCUMENTS 5,751,822 A 5/1998 Yamaguchi et al.
7,139,701 B2 11/2006 Harton et al.
(Continued)

FOREIGN PATENT DOCUMENTS

EP 0686408 B1 8/2000
JP H11237898 A 8/1999

OTHER PUBLICATIONS

International Search Report received for PCT International Application No. PCT/IB2021/055444, mailed on Sep. 24, 2021, 4 pages.

*Primary Examiner* — Kenny H Truong

(57) ABSTRACT

A method of communicating using a breathing apparatus includes receiving an audio signal from a sound acquisition unit. The method further includes determining a state of the breathing apparatus based on the received audio signal. The state is at least one of a first state and a second state. The method further includes applying a first filter on the audio signal if the determined state is the first state. The first filter has a first frequency response. The method further includes applying a second filter on the audio signal if the determined state is the second state. The second filter has a second frequency response different from the first frequency response of the first filter. The method further includes generating an output signal based on the application of the first filter or the second filter. The method further includes receiving the output signal at an output device.

18 Claims, 10 Drawing Sheets

(56) References Cited

U.S. PATENT DOCUMENTS

| | | | |
|---|---|---|---|
| 7,254,535 | B2 | 8/2007 | Kushner et al. |
| 9,418,675 | B2 | 8/2016 | Zhu et al. |
| 10,166,416 | B2 | 1/2019 | Kihlberg |
| 2006/0009970 | A1 | 1/2006 | Harton et al. |
| 2009/0192799 | A1 | 7/2009 | Griffin et al. |
| 2010/0081226 | A1 | 5/2010 | Zimmerman et al. |
| 2010/0108065 | A1* | 5/2010 | Zimmerman .......... A62B 18/08 128/204.23 |
| 2012/0084084 | A1 | 4/2012 | Zhu et al. |
| 2014/0081631 | A1* | 3/2014 | Zhu ..................... G10L 21/0208 704/226 |
| 2017/0110142 | A1 | 4/2017 | Fan et al. |
| 2017/0296094 | A1 | 10/2017 | Fonzi, III et al. |

* cited by examiner

BREATHING APPARATUS AND METHOD OF COMMUNICATING USING BREATHING APPARATUS

TECHNICAL FIELD

The present disclosure relates to the field of personal protective equipment, such as a breathing apparatus. More specifically, the present disclosure relates to a breathing apparatus and a method of communicating using the breathing apparatus.

BACKGROUND

Personal protective equipment (PPE), such as respiratory protection devices, may be used by emergency personnel, for example, firefighters, law enforcement, first responders, healthcare professionals, paramedics or other personnel who work in potentially hazardous environments, for example, chemical, biological, or nuclear environments, or fires. While a large variety of respiratory protection devices are available, some commonly used devices may include powered air purifying respirators (PAPR) and a self-contained breathing apparatus (SCBA).

Respiratory protection devices may typically include a purge valve that may fluidly communicate a facepiece or the PPE with ambient environment. Such valves may be helpful in conditions where sufficient flow of a breathing gas is not provided by the facepiece to a user. When the purge valve is actuated by the user, air may directly flow from the outside to the facepiece. This generally produces a loud hissing noise inside the facepiece known as purge noise.

The personnel using the respiratory protection devices may often rely on an onboard voice communication system as it becomes difficult to conduct face-to-face communication or wireless communication of speech when the facepiece or the PPE is worn by the user. The voice communication system may provide, for example, voice amplification, transmission and/or radio communication functionality. However, any communication system may be severely degraded by background noise.

Conventional voice communication systems generally detect the purge noise inside the facepiece and subsequently disable voice communication through the facepiece to mitigate any purge noise from being transmitted. However, this is not desirable as the user may need to communicate when the purge valve is actuated by the user.

SUMMARY

In one aspect, a method of communicating using a breathing apparatus is described. The method includes receiving an audio signal from a sound acquisition unit. The method further includes determining a state of the breathing apparatus based on the received audio signal. The state is at least one of a first state and a second state. The method further includes applying a first filter on the audio signal if the determined state is the first state. The first filter has a first frequency response. The method further includes applying a second filter on the audio signal if the determined state is the second state. The second filter has a second frequency response different from the first frequency response of the first filter. The method further includes generating an output signal based on the application of the first filter or the second filter on the audio signal. The method further includes receiving the output signal at an output device.

In another aspect, a breathing apparatus is described. The breathing apparatus includes a facepiece, an audio processing unit, and an output device. The sound acquisition unit is configured to generate an audio signal in response to a sound inside the facepiece. The audio processing unit is configured to receive the audio signal from the sound acquisition unit. The audio processing unit is further configured to determine a state of the breathing apparatus based on the received audio signal. The state is at least one of a first state and a second state. The audio processing unit is further configured to apply a first filter on the audio signal if the determined state is the first state. The first filter has a first frequency response. The audio processing unit is further configured to apply a second filter on the audio signal if the determined state is the second state. The second filter has a second frequency response different from the first frequency response of the first filter. The audio processing unit is further configured to generate an output signal based on the application of the first filter or the second filter on the audio signal. The output device receives the output signal from the audio processing unit.

In a further aspect, a method of communicating using a breathing apparatus having a facepiece and a purge valve is described. The method includes receiving an audio signal from a sound acquisition unit. The method further includes determining a state of the breathing apparatus based on the received audio signal. The state is at least one of a purge-off state and a purge-on state. In the purge-off-state, the purge valve is closed. Further, in the purge-on state, the purge valve is at least partially open. The purge valve fluidly communicates the facepiece with an ambient when the purge valve is at least partially open. The method further includes applying a first filter on the audio signal if the determined state is the purge-off state. The first filter has a first frequency response. The method further includes applying a second filter on the audio signal if the determined state is the purge-on state. The second filter has a second frequency response different from the first frequency response of the first filter. The method further includes generating an output signal based on the application of the first filter or the second filter on the audio signal. The method further includes receiving the output signal at an output device.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
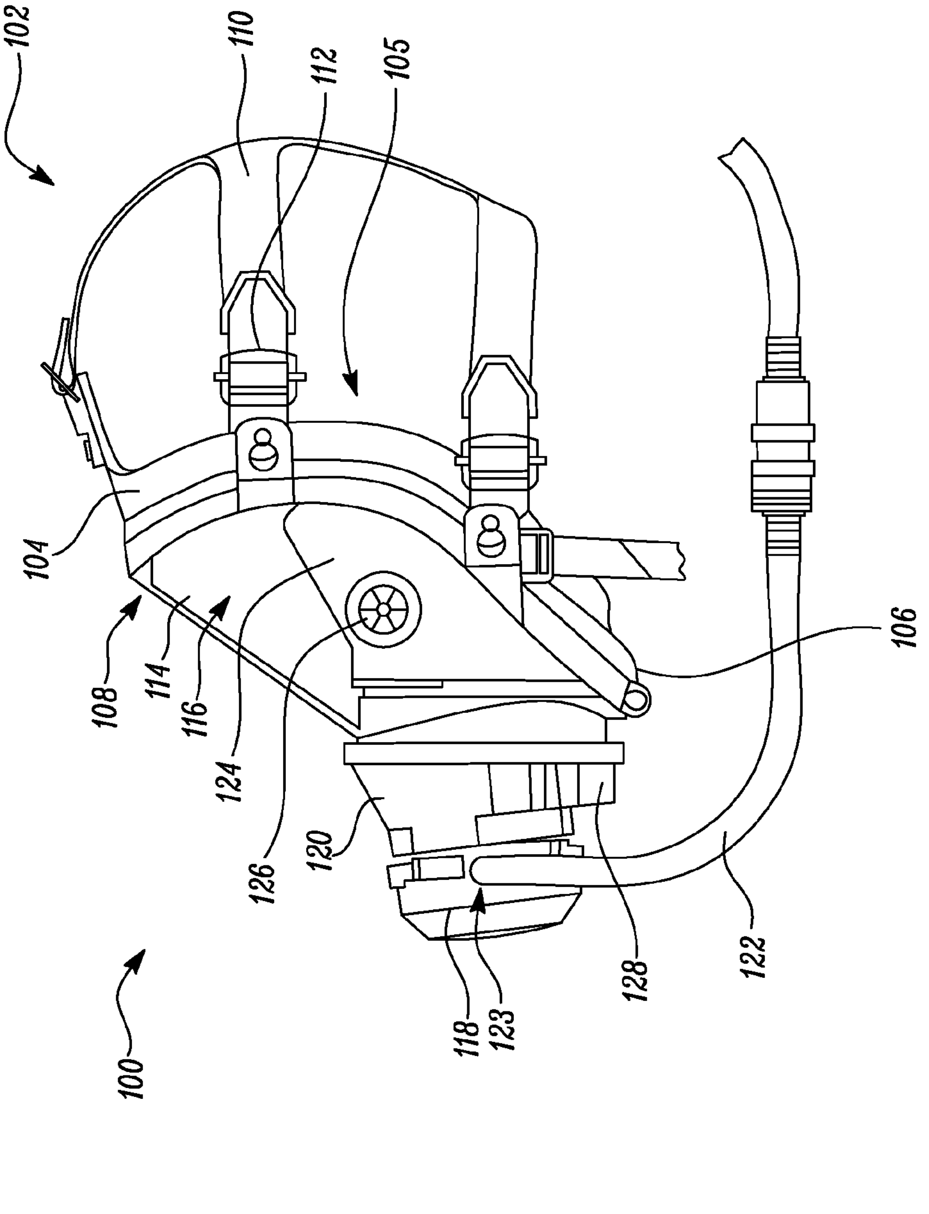
FIG. 1 illustrates a schematic view of an example of a breathing apparatus, in accordance with techniques of this disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The term "audio signal" as used herein refers to a representation of sound in electrical form. An audio signal may be represented in the form of electrical voltage for analog signals, or a series of binary numbers for digital signals.

The term "microphone" as used herein refers to a transducer or sensor that converts sound into an electrical audio signal.

Unless otherwise mentioned, the term "filter" as used herein refers to an audio filter. An audio filter is a frequency dependent amplifier circuit that operates in audio frequency range. The audio filter may attenuate or amplify a particular frequency range based on the characteristics of the audio filter. The term "filter" also refers to an audio filter that provides a single filter function, such as a low-pass, high-pass, band-pass, or band-reject filter function.

The term "low pass filter" as used herein denotes any device that passes signals in a low-frequency band but blocks signals in a high-frequency band. The bands may be defined based on a cutoff frequency. Conversely, the term "high pass filter" denotes any device that passes signals in the high-frequency band but blocks signals in the low-frequency band.

The term "equalization filter" as used herein refers to any device that adjusts a balance between the frequency components within an audio signal.

As used herein, the term "frequency response" of a system (e.g., a transducer) or an audio filter refers to an output-to-input ratio of the system or the audio filter as a function of frequency. The frequency response is typically characterized by the magnitude of the system's (or the audio filter's) transfer function, measured in dB, versus frequency, measured in Hz. Further, the term "frequency response" may describe a bandwidth, a phase response, and/or a sensitivity of the system or the audio filter over a particular bandwidth.

The term "history window" as used herein refers to a period of time for which an audio signal is under consideration.

The term "time frame" as used herein refers to a time period within the history window.

According to aspects of this disclosure, a method of communicating using a breathing apparatus includes receiving an audio signal from a sound acquisition unit. The method further includes determining a state of the breathing apparatus based on the received audio signal. The state is at least one of a first state and a second state. The method further includes applying a first filter on the audio signal if the determined state is the first state. The first filter has a first frequency response. The method further includes applying a second filter on the audio signal if the determined state is the second state. The second filter has a second frequency response different from the first frequency response of the first filter. The method further includes generating an output signal based on the application of the first filter or the second filter on the audio signal. The method further includes receiving the output signal at an output device.

The first state may refer to a state of the breathing apparatus where the purge valve is closed, while the second state may refer to a state of the breathing apparatus where the purge valve is at least partially open. Purge noise may be generated when the purge valve is at least partially open. The first filter may mitigate noise and allow speech transmission when the purge valve is closed. Further, the second filter may cut off a higher frequency range and may allow a lower frequency range to pass through. The purge noise, which typically falls in the high frequency range, may then be suppressed while allowing speech transmission (which falls in the lower frequency range) to pass through the second filter. This may restrict purge noise from being transmitted in the output signal while allowing speech of a user to pass through even when the purge valve is at least partially open.

FIG. 1 illustrates a schematic view of an example of a breathing apparatus 100. The breathing apparatus 100 is intended to be worn by a user. In some examples, the breathing apparatus 100 may be used by emergency personnel, e.g., firefighters, law enforcement, medical personnel, first responders, paramedics, or other personnel who work in potentially hazardous environments, e.g., chemical, biological or nuclear environments, fires, or other physical environments, e.g., construction sites, mining or manufacturing sites.

In some examples, the breathing apparatus 100 may be a part of a personal protective equipment (PPE). Examples of PPE may include, but are not limited to, respiratory protection equipment (including disposable respirators, reusable respirators, powered air purifying respirators, and supplied air respirators), protective eyewear, such as visors, goggles, filters or shields (any of which may include augmented reality functionality), protective headwear, such as hard hats, hoods or helmets, hearing protection (including ear plugs and ear muffs), protective shoes, protective gloves, other protective clothing, such as coveralls and aprons, protective articles, such as sensors, safety tools, detectors, global positioning devices, mining cap lamps, fall protection harnesses, exoskeletons, self-retracting lifelines, heating and cooling systems, gas detectors, and any other suitable gear configured to protect the user from injury.

The breathing apparatus 100 includes a facepiece 102 having a face blank 104 and a rear opening 105 which seals around a face of a user. The face blank 104 may further include a chin portion 106 that seals around a chin area of the user. Further, the face blank 104 may include side sections that seal around respective sides of the face of the user and a forehead portion 108, opposite the chin portion 106, which seals around a forehead of the user. In some examples, the face blank 104 may be fabricated, for instance, from a flexible material, such as rubber, silicon, foam, plastic, and the like. In some examples, the face blank 104 may be formed of a material that is selected to be substantially impermeable to airborne environmental hazards that the breathing apparatus 100 may be designed to offer a barrier to.

In some examples, the face blank 104 may be designed to form a seal at its periphery with the face of the user. Further, the facepiece 102 may cover substantially an entire face of the user. The face blank 104 further includes a series of cooperative straps 110 that are affixed to the facepiece 102 to provide a means by which the user is able to forcibly bring the facepiece 102 into contact with the face of the user to effect a seal therewith. In some examples, the straps 110 may be elasticized to ensure a continuing seal, notwithstanding movement of the user. The straps 110 includes clamps 112 that may allow the breathing apparatus 100 to be adjusted for loose fit on the face of the user.

The face blank 104 may include a lens opening at an upper portion of the facepiece 102. A transparent medium 114 is disposed in the lens opening. The transparent medium 114 may be coupled to the face blank 104 using one or more methods. For example, the transparent medium 114 and the face blank 104 may be assembled using at least one of an adhesive, an interference fit, a fastener (e.g., clip, latch, and the like), or any other fastening means. In some examples, the transparent medium 114 may be configured to provide a substantially full field of view to the user. In some examples, the transparent medium 114 may be a substantially unitary piece of material (e.g., polycarbonate) having a curved contour. For example, the transparent medium 114 may be molded from a single type of material and then coated (e.g., silicone) to protect the transparent medium 114. The transparent medium 114 may have an interior side that faces the user and defines an interior space 116 of the facepiece 102 between the transparent medium 114 and the face of the user.

The breathing apparatus 100 further includes a regulator 118. In the illustrated example of FIG. 1, the regulator 118 is mounted at a lower portion of the facepiece 102. The regulator 118 may deliver a breathing gas to the facepiece 102 from a supply line 122 of pressurized gas. In some examples, the regulator 118 may reduce the incoming breathing gas to a designated pressure that is suitable for breathing by the user. In some examples, the breathing gas may be delivered via the supply line 122 at an intermediate pressure from a high-pressure source, such as a tank or a cylinder of gas (not shown). In some examples, the breathing apparatus 100 may be a self-contained breathing apparatus (SCBA) or a powered air-purifying respirator (PAPR) wherein pressurized gas may be supplied through the supply line 122 from the high-pressure source.

The regulator 118 is configured to be in fluid communication with an adaptor 120. In some examples, the regulator 118 may be removably coupled to the adaptor 120. The adaptor 120 may be attached to the facepiece 102. The pressurized breathing gas from the high-pressure source may be delivered to an inlet opening 123 on the regulator 118. A further passage (not shown) may conduct the breathing gas from the regulator 118 through the adaptor 120 and deliver the breathing gas into the interior space 116 of the facepiece 102. In some examples, the pressurized gas may be conveniently provided to the interior space 116, such that condensation and other moisture, including exhalation moisture, may be diminished and a defogging of the transparent medium 114 may be effected.

A nose cup 124 is disposed in the interior space 116. The nose cup 124 may be configured to cover the nose and mouth of the user in a sealing manner. In the illustrated example of FIG. 1, the nose cup 124 serves as a fluid divider which separates an outside portion from an inside portion of the nose cup 124. As used herein, the term "outside portion" may refer to the interior space 116 of the facepiece 102 between the transparent medium 114 and the face of the user. The term "inside portion" may refer to a space between the nose cup 124 and the face of the user.

The nose cup 124 includes one or more inhalation valves 126. In some examples, the inhalation valve 126 may be configured as a check valve of disk type that enables flow from the outside to the inside portion of the nose cup 124 while preventing flow in the opposite direction. In some examples, the inhalation valve 126 may have other configurations, such as a poppet, a mushroom or a flapper valve. A negative pressure may be generated inside the interior space 116 of the facepiece 102 due to inhalation of breathing gas by the user. The negative pressure generated within the interior space 116 may draw the breathing gas from the regulator 118 to the interior space 116 responsive to the breathing of the user.

In some examples, the nose cup 124 may include a central opening (not shown) which is open through the lower portion of the facepiece 102 to a chamber (not shown) in the adaptor 120. The chamber of the adaptor 120 may include an outlet 128. Alternatively, the outlet 128 may be disposed on the regulator 118. Airflow through the outlet 128 may be controlled by an exhalation valve (not shown). The exhalation valve may be configured to allow air to escape from the chamber of the adaptor 120 when the pressure in the chamber is at a predetermined level above the ambient atmospheric pressure. Air exhaled by the user may pass through the central opening of the nose cup 124 into the chamber of the adaptor 120. Air exhaled by the user may then flow out of the adaptor 120 through the exhalation valve and the outlet 128.

In some examples, the exhalation valve may be configured as a disk type valve that is spring loaded to a closed position. In other examples, the exhalation valve may have other configurations such as a poppet, a mushroom or a flapper valve. In some examples, the exhalation valve may be configured to prevent airflow from the atmosphere to enter the chamber inside the adaptor 120.

In some examples, the breathing apparatus 100 may further include accessories such as voice emitters, filtering components, etc. For example, the voice emitters may be mounted on the breathing apparatus 100 to amplify the voice of the user to facilitate communication with other individuals and help provide intelligible speech transmittance through the breathing apparatus 100. In some examples, the breathing apparatus 100 may further include a voice communication system that provides, for example, voice amplification, transmission and/or radio communication functionality.

Figure 2B:
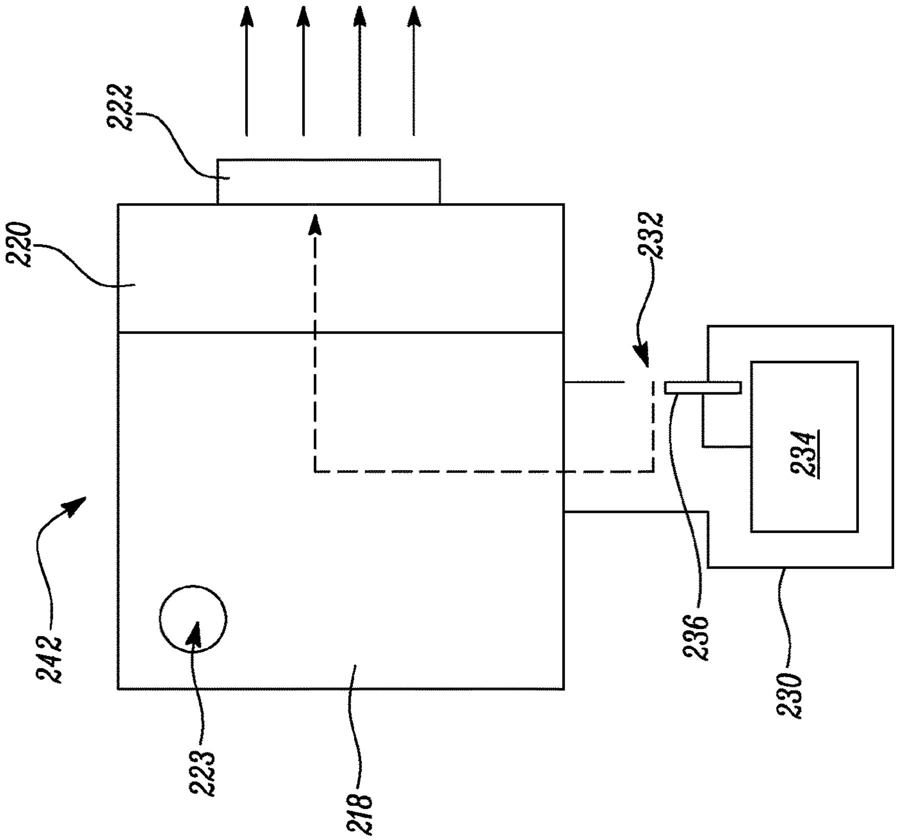
FIGS. 2A-2B illustrate schematic views of an example of a regulator of the breathing apparatus of FIG. 1, in accordance with techniques of this disclosure.
Figure 2A:
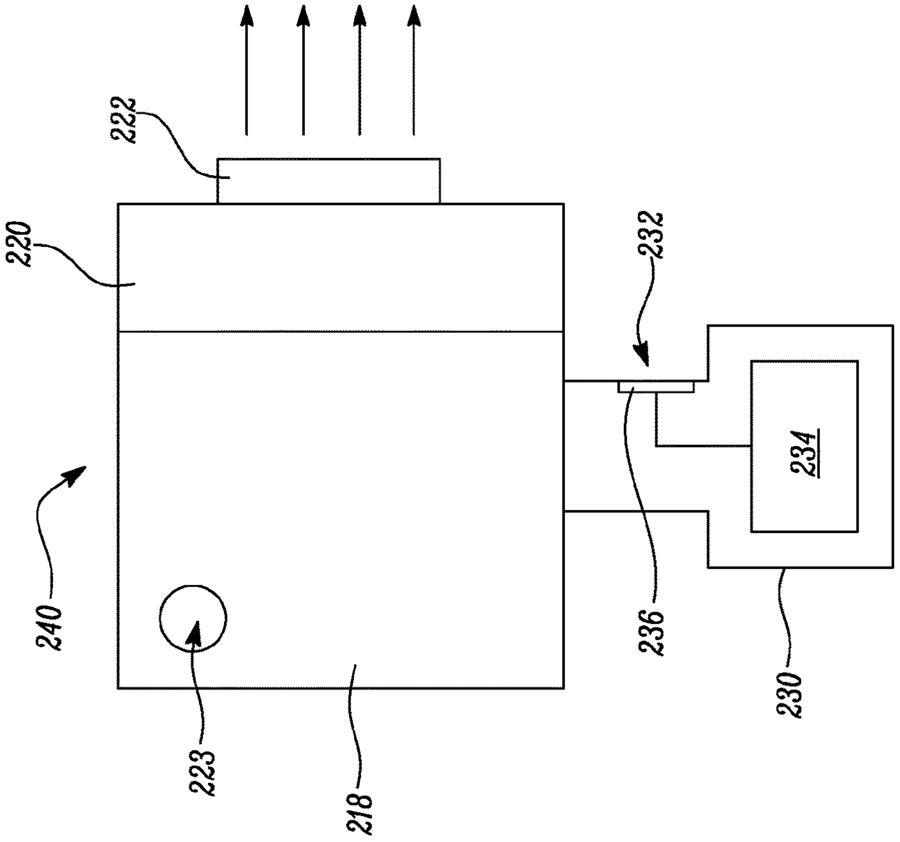

FIGS. 2A-2B illustrate a schematic view of an example of a regulator 218 of a breathing apparatus 100. The regulator 218 may be similar to the regulator 118 of the breathing apparatus 100 of FIG. 1. The regulator 218 may be removably coupled to an adaptor 220. The adaptor 220 may be similar to the adaptor 120 of FIG. 1. Referring now to FIGS. 1 and 2A, the adaptor 220 includes a spray bar 222 having a plurality of gas delivery openings (not shown) through which the breathing gas may enter the interior space 116 of the facepiece 102. In some examples, the gas delivery openings of the spray bar 222 may be positioned in the interior space 116 of the facepiece 102 outside the nose cup 124.

The regulator 218 further includes a purge valve 230 that fluidly communicates the facepiece 102 with an ambient when the purge valve 230 is at least partially open. In some examples, the purge valve 230 may allow air to enter through an opening 232 of the purge valve 230 and flow into the facepiece 102 when the purge valve 230 is at least partially open. The purge valve 230 may bypass the flow of breathing gas from the high-pressure source through an inlet opening 223 on the regulator 218. In some examples, the inlet opening 223 may be similar to the inlet opening 123 of FIG. 1.

In some examples, the purge valve 230 may include an actuator 234 coupled to a valve member 236. In the example shown in FIG. 2A, the valve member 236 covers the opening 232 of the purge valve 230 restricting air from entering through the opening 232. This may represent a first state 240 of the breathing apparatus 100. In some examples, the first state 240 may correspond to a purge-off state of the breathing apparatus 100. The actuator 234 may be actuated to control the valve member 236 and selectively open or close the opening 232. In some examples, the actuator 234 may be configured as a manually controlled knob. For example, the opening 232 of the purge valve 230 may be opened by manually rotating a control portion of a knob. In some examples, the actuator 234 of the purge valve 230 may be configured as a purge button. In some examples, the purge valve 230 may be actuated manually. In other examples, the purge valve 230 may be actuated automatically. It should be understood that any form or configuration of the purge valve 230, the actuator 234 and the valve member 236 may be utilized based on application requirements without limiting the scope of the present disclosure.

FIG. 2B illustrates a schematic view of the regulator 218 in which the purge valve 230 is at least partially open. This may represent a second state 242 of the breathing apparatus 100. In some examples, the second state 242 may correspond to a purge-on state of the breathing apparatus 100. In the illustrated example, the valve member 236 may be controlled by the actuator 234 to allow air to flow through the opening 232 of the purge valve 230 in the open state of the purge valve 230. Referring to FIGS. 1 and 2B, air may flow towards the spray bar 222 and into the interior space 116 of the facepiece 102 through the plurality of gas delivery openings (not shown) of the spray bar 222. In some examples, the opening 232 may be partially or fully covered by the valve member 236. In some examples, as the air flows towards the facepiece 102, it may produce a noise inside the facepiece 102. The noise may be referred to as a purge noise.

In some examples, the purge valve 230 may be configured as a safety valve which may be actuated by the user during emergency conditions. For example, the user may actuate the purge valve 230 when sufficient flow of breathing gas is not provided by the regulator 218. When the purge valve 230 is actuated through the actuator 234, air may freely flow to the interior space 116 of the facepiece 102 and may be inhaled by the user through the one or more inhalation valves 126. Additionally, or alternatively, the purge valve 230 may also be actuated to mitigate fogging of the transparent medium 114 from inside the facepiece 102 due to condensation of moisture, for example, due to exhalation by the user.

Figure 3:
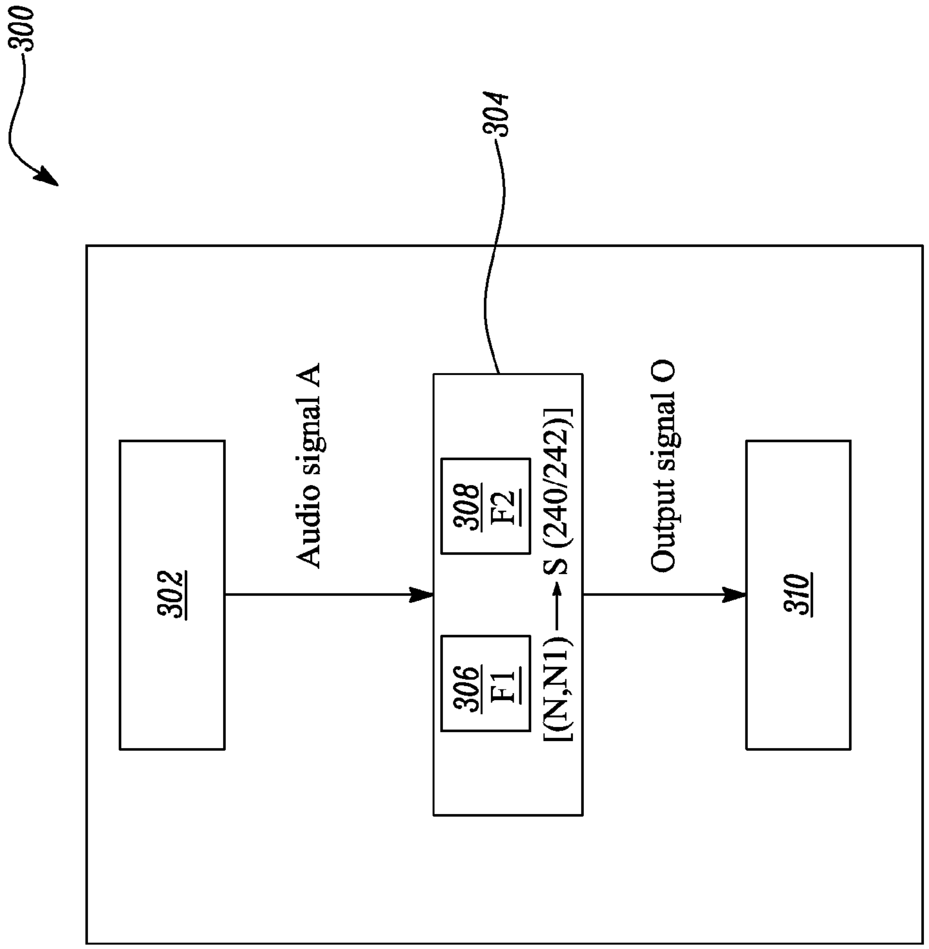
FIG. 3 is a block diagram illustrating an exemplary breathing apparatus, in accordance with techniques of this disclosure.

FIG. 3 is a block diagram illustrating an exemplary breathing apparatus 300. The breathing apparatus 300 may be similar to the breathing apparatus 100 of FIGS. 1, 2A and 2B, and similar reference numbers are used to designate same or similar elements. Referring to FIGS. 1, 2A, 2B and 3, the breathing apparatus 300 includes the facepiece 102 having a sound acquisition unit 302 configured to generate an audio signal A in response to a sound inside the facepiece 102. The sound acquisition unit 302 may be suitably configured and positioned to detect the sound inside the facepiece 102, for example, a sound of user speech. The sound acquisition unit 302 may also detect other sounds associated within the breathing apparatus 300, for example, breathing sound of the user, background noise, low pressure alarm noise, personal alert safety system noise, etc.

In some examples, the sound acquisition unit 302 may include a microphone. In some examples, the sound acquisition unit 302 may include multiple microphones. As used herein, the term "microphone" refers to a transducer or sensor that converts sound into an electrical audio signal. The sound acquisition unit 302 may receive mechanical vibrations from the user speech and may convert the mechanical vibrations into electric audio signals. In some examples, the electric audio signals may comprise a speech signal corresponding to user speech, and a noise signal indicative of other sounds inside the facepiece 102.

The sound acquisition unit 302 may be mounted inside the facepiece 102 and the nose cup 124. Alternatively, the sound acquisition unit 302 may be mounted outside the facepiece 102. In such an arrangement, the sound acquisition unit 302 may include a diaphragm coupled to the microphone. The diaphragm may transmit mechanical vibrations from the user speech inside the facepiece 102 to the microphone outside the facepiece 102. It should be understood that other arrangements of the sound acquisition unit 302 are also possible and are within the scope of the present disclosure. A user, for example a firefighter, typically wears the breathing apparatus 300 in an emergency situation, and therefore his or her face may be tightly covered by the facepiece 102. When the user starts to speak, the voice may generate positive pressure inside the facepiece 102 that may be picked up by the sound acquisition unit 302.

The breathing apparatus 300 further includes an audio processing unit 304 configured to receive the audio signal A from the sound acquisition unit 302. The audio signal A may also be interchangeably referred to as "the received audio signal A". In some examples, the audio processing unit 304 may process the detected sound and deliver a processed speech to an amplifier and/or a speaker for face-to-face communication and to a wireless communication interface for wireless communications. For example, the audio processing unit 304 may eliminate breathing sound of the user from being transmitted outside the facepiece 102. Further, the breathing apparatus 300 may be equipped with noise cancellation functionality that may cancel an ambient noise.

The audio processing unit 304 is configured to determine a state S of the breathing apparatus 300 based on the received audio signal A. The state S may also be interchangeably referred to as "the determined state S". The state S is at least one of the first state 240 and the second state 242 (refer to FIGS. 2A and 2B). In some examples, the first state 240 may correspond to a purge-off state when the purge valve 230 is closed and the second state 242 may correspond to a purge-on state when the purge valve 230 is at least partially open. As described previously, the purge valve 230 may be configured to be actuated by the user of the breathing apparatus 300. The purge valve 230 may be configured to be partially or fully opened by the user. Thus, the purge valve 230 may have different configurations, for example, closed, partially open, and completely open. Further, the purge valve 230 may fluidly communicate the facepiece 102 with the ambient when the purge valve 230 is at least partially open and air may flow from the outside to the interior space 116 of the facepiece 102. This flow of air may produce a noise inside the facepiece 102, for example, a loud hissing noise.

Figure 4:
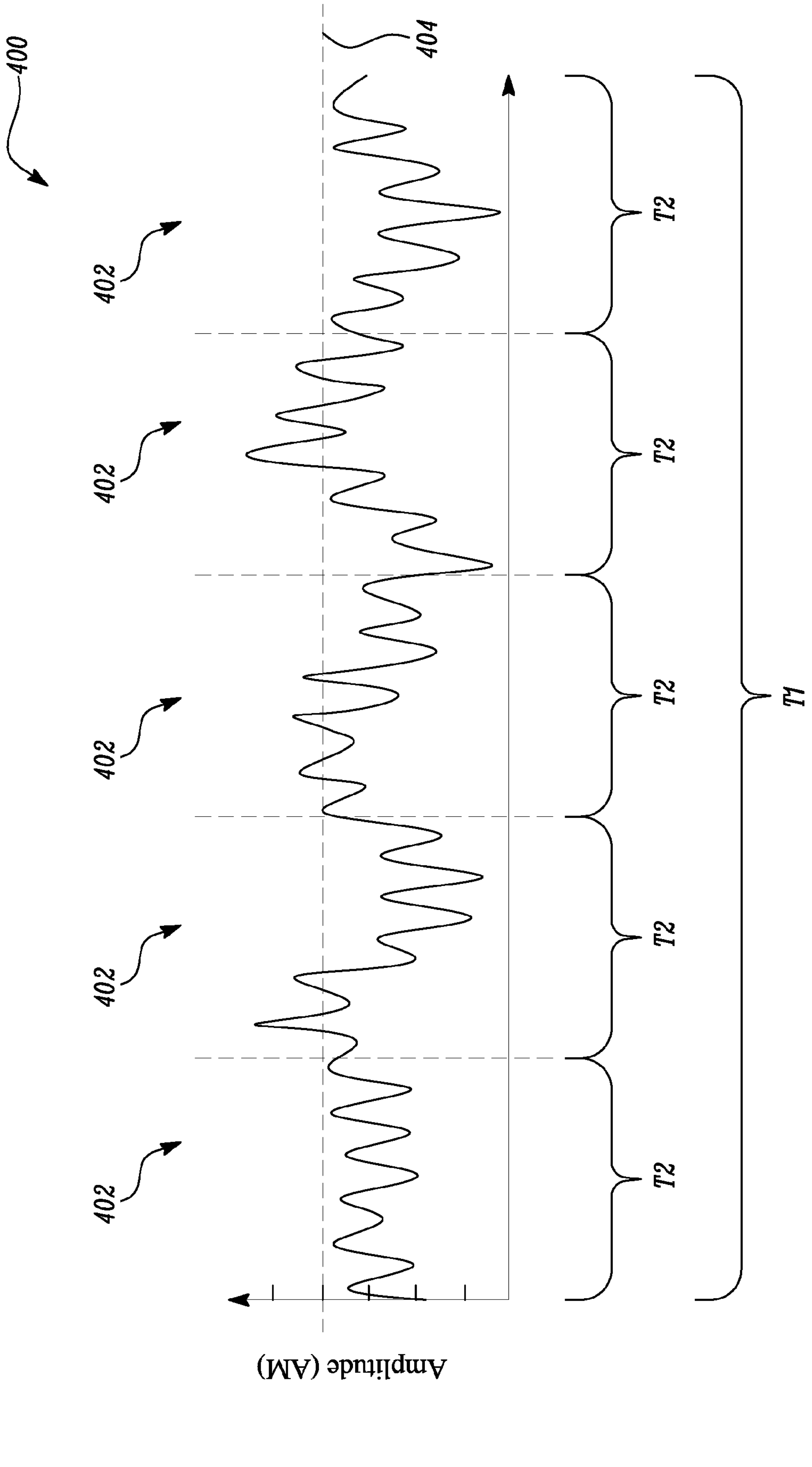
FIG. 4 illustrates an example of a history window of an audio signal, in accordance with techniques of this disclosure.

The state S of the breathing apparatus 300 may be determined by the audio processing unit 304 and will be described in detail hereinafter. Specifically, the state S of the breathing apparatus 300 may be either the purge-on state or the purge-off state. In some examples, the audio processing unit 304 may be configured to obtain the audio signal A over a history window. The audio signal A may be generated by the sound acquisition unit 302. FIG. 4 illustrates an example of a history window 400 of an audio signal A. The history window 400 may correspond to a first time period T1. As used herein, "history window" refers to a period of time for which an audio signal A is under consideration. For example, the history window 400 or the first time period T1 may correspond to a period of 30 milliseconds.

In some examples, the audio processing unit 304 may include a processor and suitable circuitry for carrying out various functions of the audio processing unit 304. The circuitry may include one or more analog-to-digital converters, a digital-to-analog converters, input/output ports, buses, and so forth. In some cases, the audio processing unit 304 may be embodied as a printed circuit board including various electronic components. In some examples, the audio processing unit 304 may further include a memory to store the history window 400. In some examples, the memory may be a main memory, a static memory, or a dynamic memory. In some examples, the memory may include, but may not be limited to, a computer readable storage media, such as various types of volatile and non-volatile storage media, including but not limited to, random access memory, read-only memory, programmable read-only memory, electrically programmable read-only memory, electrically erasable read-only memory, flash memory, and the like.

The audio processing unit 304 may be further configured to divide the history window 400 into a plurality of time frames 402. As used herein, the term "time frame" may refer to a time period within the history window 400. Each time frame 402 may correspond to a second time period T2 less than the first time period T1 (i.e., T2<T1). In some examples, the second time period T2 may correspond to a period of 3 milliseconds. The second time period T2 may be determined depending on factors, such as a cycle of the breadth of the user. For example, the history window 400 may comprise 10 of the time frames 402 with the first time period T1 of 30 milliseconds and the second time period T2 of 3 milliseconds. The time frames 402 shown in FIG. 4 are exemplary in nature. It should be understood that the values of the first time period T1 and the second time period T2 are by way of example only, and the values may change as per the application requirements.

The audio processing unit 304 may be further configured to compare an amplitude AM of the audio signal A in the plurality of time frames 402 with a predetermined noise threshold 404. In other words, the amplitude AM of the audio signal A in each time frame 402 may be compared with the predetermined noise threshold 404. Specifically, the amplitude AM of the audio signal A may be above or below the predetermined noise threshold 404. The predetermined noise threshold 404 may correspond to the noise generated due to actuation of the purge valve 230, for example, the purge noise. The predetermined noise threshold 404 may be selected based on an amplitude of the purge noise. In some examples, the predetermined noise threshold 404 may be subjected to modifications as per application requirements. In some cases, the predetermine noise threshold 404 may be selected based on operating conditions of the breathing apparatus 300.

The audio processing unit 304 may be further configured to determine a purge noise frame count N in the history window 400 corresponding to a number of time frames 402 in which the amplitude AM of the audio signal A exceeds the predetermined noise threshold 404. The time frames 402 may be determined wherein the amplitude AM of the audio signal A is greater than the predetermined noise threshold 404. Such time frames 402 may be added to the purge noise frame count N.

The audio processing unit 304 may be further configured to determine that the breathing apparatus 300 is in the purge-on state if the purge noise frame count N is greater than a predetermined purge count threshold N1. In some examples, the purge count threshold N1 may be 90%. It means that if 90% of the time frames 402 in the history window 400 are included in purge noise frame count N, then the breathing apparatus 300 is determined to be in purge-on state. In some examples, the purge count threshold N1 may be 80%. In other examples, the purge count threshold N1 may be between 40% to 100%. It should be understood that the value of purge count threshold N1 is by way of example only, and the value may change as per the application requirements. Similarly, the audio processing unit 304 may be further configured to determine that the breathing apparatus 300 is in the purge-off state if the purge noise frame count N is less than or equal to the predetermined purge count threshold N1.

Figure 5:
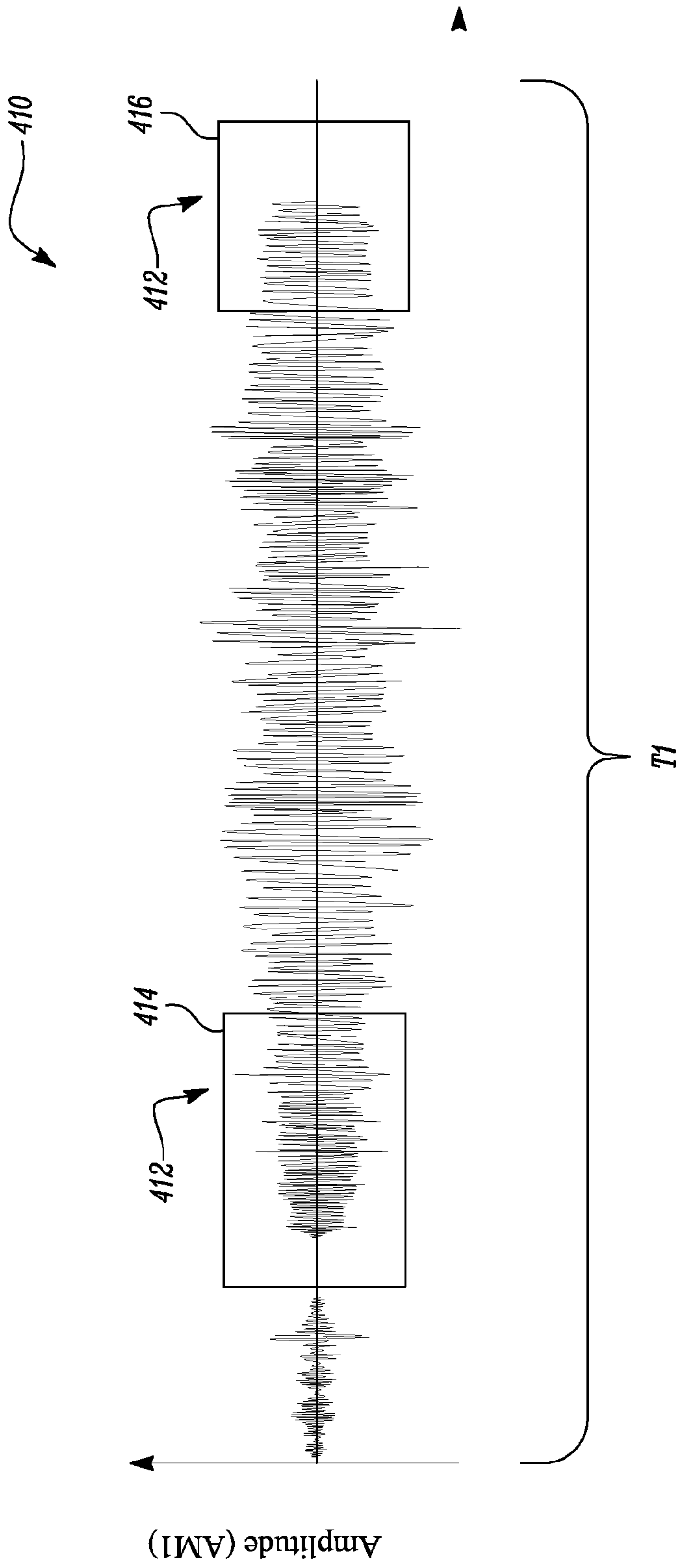
FIG. 5 illustrates an example of an audio signal, in accordance with techniques of this disclosure.

FIG. 5 illustrates an example of an audio signal 410 and corresponding time frames 412. Referring to FIGS. 3 and 5, the audio processing unit 304 may be configured to compare an amplitude AM1 of the audio signal 410 in time frame 412 with a predetermined noise threshold (not shown). The audio processing unit 304 may determine a purge noise frame count N corresponding to a number of the time frames 412 in which the amplitude AM1 of the audio signal 410 exceeds the predetermined noise threshold. The breathing apparatus 300 may be in the purge-on state if the purge noise frame count N is greater than the predetermined purge count threshold N1, for example, 90%. In the example of FIG. 5, only two time frames 412 are shown for illustration purpose only. A first frame 414 corresponds to beginning of purge-on state of the breathing apparatus 300 while a second frame 416 corresponds to purge-off state. Further, a count of the time frames 412 (not shown) between the first frame 414 and the second frame 416 may be above the predetermined purge count threshold N1.

Referring to FIGS. 3, the audio processing unit 304 includes a first filter 306 that may process the audio signal A received from the sound acquisition unit 302. As used herein, the term "filter" refers to an audio filter. An audio filter is a frequency dependent amplifier circuit that operates in audio frequency range where the audio filter may attenuate or amplify a particular frequency range based on the characteristics of the audio filter. The audio processing unit 304 is further configured to apply the first filter 306 on the audio signal A if the determined state S is the first state 240. In some examples, the first state 240 may correspond to the purge-off state.

The first filter 306 has a first frequency response F1. FIGS. 6A-6D illustrate various examples of the frequency response of the first filter 306. Specifically, FIGS. 6A-6D illustrate frequency responses of first filters 306A, 306B, 306C and 306D, respectively. The first filters 306A-306D may be collectively referred to as the first filter 306. In some examples, the first frequency response F1 of the first filter 306 is inverse of a frequency response F (shown in FIG. 6A) of the facepiece 102 (shown in FIG. 1). In general, the facepiece 102 may have a characteristic frequency response and may amplify or attenuate certain frequencies corresponding to its characteristic frequency response. The frequency response F corresponds to the characteristic frequency response of the facepiece 102. The first filter 306 may modify the audio signal A opposite to the frequency response F of the facepiece 102. Thus, the first filter 306 may amplify a given frequency range for which the facepiece 102 may attenuate the audio signal A, and/or vice versa.

Figure 6A:
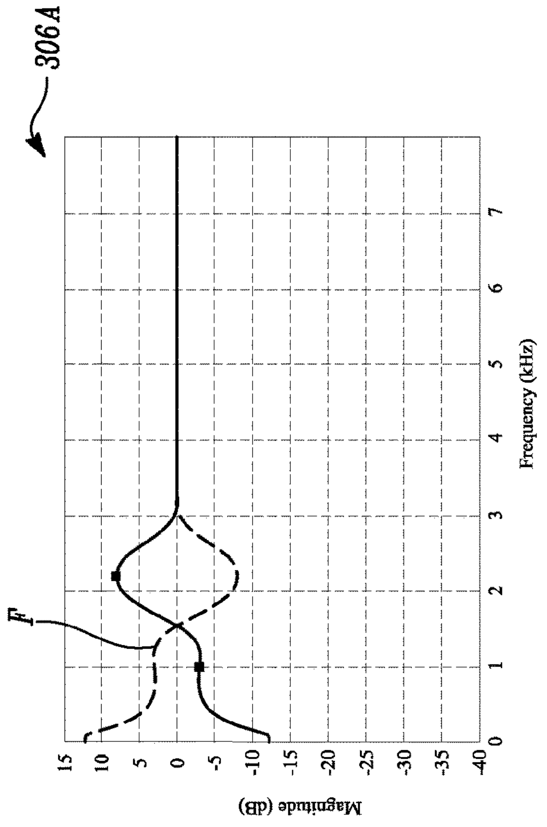
FIGS. 6A-6D illustrate various examples of a frequency response of a first filter, in accordance with techniques of this disclosure.
Figure 6B:
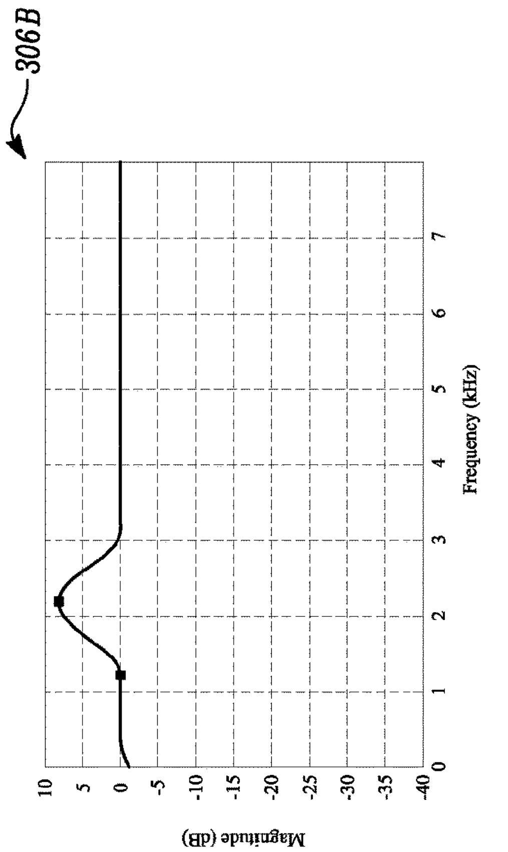
Figure 6C:
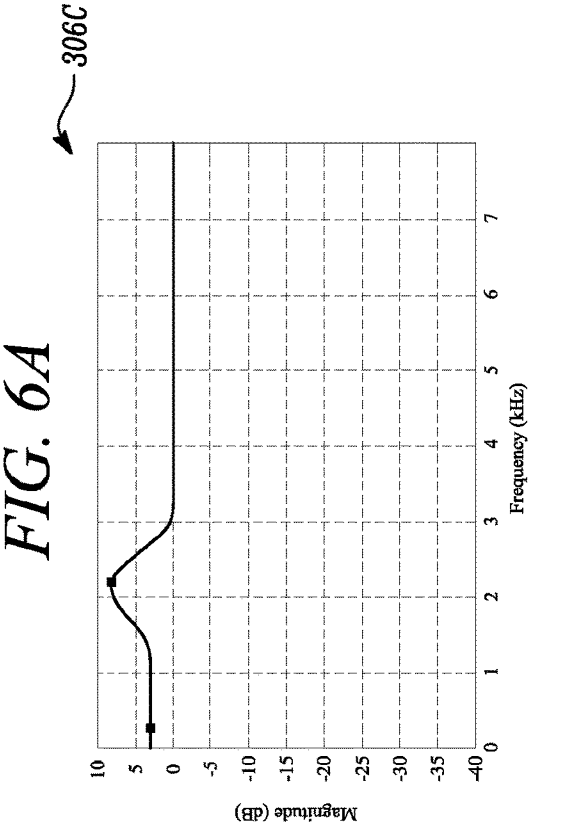
Figure 6D:
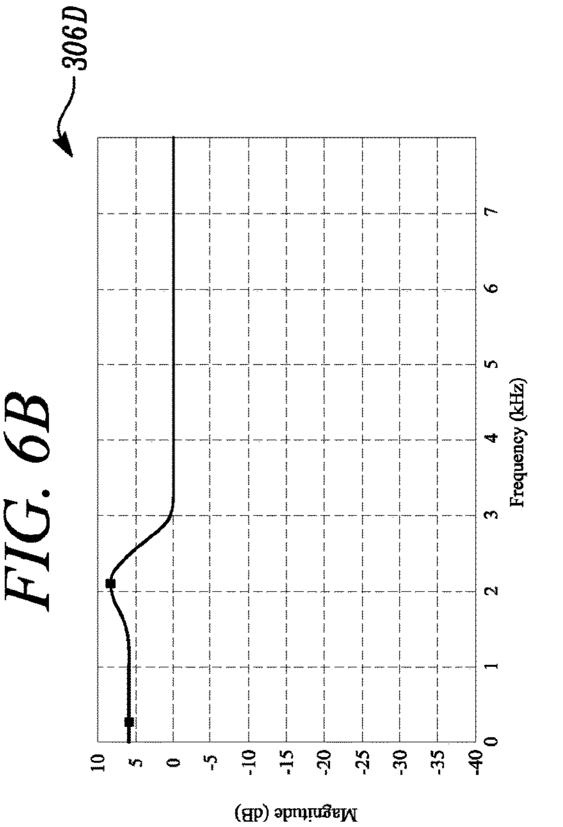

In the illustrated example of FIG. 6A, the first filter 306A may amplify frequencies within a boost frequency range. The boost frequency range may be greater than about 1.5 kilohertz (kHz) and may be less than about 3 kHz. The first filter 306A may further attenuate frequencies less than about 1 kHz. In some examples, the first filter 306A may reduce the noise generated from the breathing of the user (that may typically be in the range of about 1 kHz) from being transmitted from the facepiece 102 since the first filter 306A may suppress frequencies less than about 1 kHz. This may reduce speech distortion and render realistic and clearer audio to be transmitted from the facepiece 102. In some examples, the first filter 306A may be an equalization filter. The equalization filter may adjust a balance between the frequency components within the audio signal A. After equalization, the user speech intelligibility may be improved.

Each of the first filters 306A, 306B, 306C, 306D also amplify frequencies at least in a range from about 1.5 kHz to about 3 kHz. However, in the illustrated example of FIG. 6B, the first filter 306B does not attenuate or amplify frequencies less than about 1 kHz. In the illustrated example of FIG. 6C, the first filter 306C amplifies frequencies below 1 kHz. In the illustrated example of FIG. 6D, the first filter 306D amplifies frequencies below 1 kHz to a greater extent than the first filter 306C of FIG. 6C.

The audio processing unit 304 may be further configured to select the first filter 306 from a set of first audio filters. In some examples, the set of first audio filters may comprise audio filters with different frequency responses, such as the examples shown in FIGS. 6A-6D. Specifically, the audio processing unit 304 may be further configured to select the first filter 306 from the set of first filters 306A, 306B, 306C, 306D. For example, some audio filters may amplify a particular frequency range and others may attenuate a particular frequency range. In some examples, the one or more first filters 306 from the set of first audio filters may modify bass, treble and/or middle sections of the audio signal A. In some examples, more than one first filter 306 from the set of first audio filters may be selected. In some cases, the audio processing unit 304 may select one of the first filters 306A, 306B, 306C, 306D as the first filter 306 based on a voice parameter (e.g., pitch) of a user.

Figure 7:
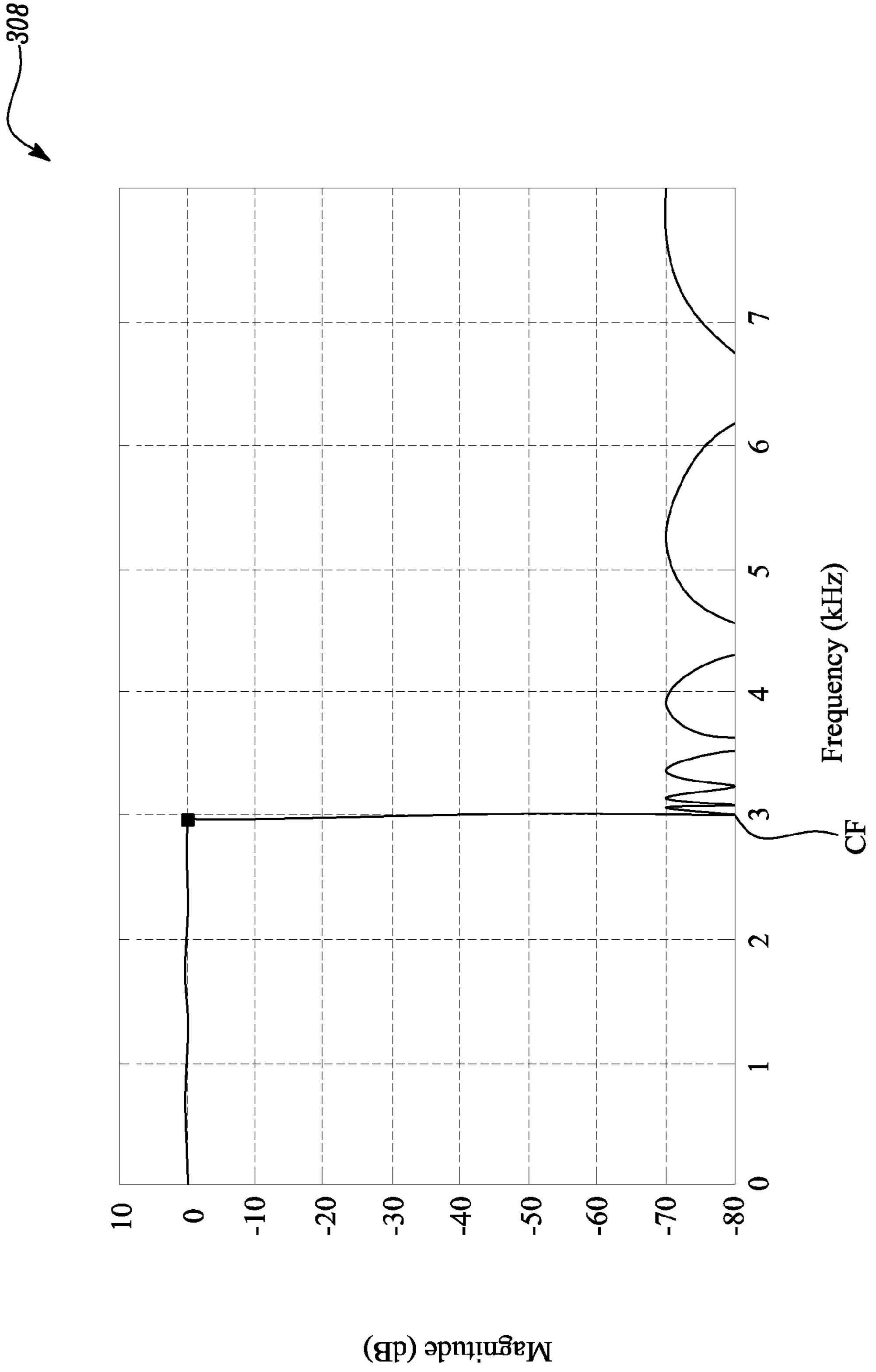
FIG. 7 illustrates an example of a frequency response of a second filter, in accordance with techniques of this disclosure.

Referring again to FIG. 3, the audio processing unit 304 may further include a second filter 308 that may process the audio signal A received from the sound acquisition unit 302. The audio processing unit 304 is further configured to apply the second filter 308 on the audio signal A if the determined state S is the second state 242. In some examples, the second state 242 may correspond to the purge-on state. The second filter 308 has a second frequency response F2 different from the first frequency response F1 of the first filter 306. FIG. 7 illustrates an example of the second frequency response F2 of the second filter 308. In the illustrated example, the second filter 308 may be a low pass filter. In the illustrated example, the second filter 308 may have a cut-off frequency CF of about 3 kHz. Thus, the second filter 308 may allow a low frequency portion of the audio signals A with a frequency less than 3 kHz to pass through the second filter 308 and may attenuate a high frequency portion of the audio signal A with frequencies greater than 3 kHz. Hence, the second filter 308 may suppress frequencies greater than 3 kHz, for example, the purge noise. The second filter 308 may therefore prevent the purge noise from being transmitted from the breathing apparatus 300. The second filter 308 may allow speech of a user to be transmitted during the purge-on state of the breathing apparatus 300 since the second filter 308 allows lower frequencies to pass through. However, in conventional systems, the voice transmission is suppressed entirely during purge-on state of a breathing apparatus.

In some examples, the audio processing unit 304 may be further configured to select the second filter 308 from a set of second audio filters. In some examples, the set of second audio filters may comprise audio filters with different frequency responses. For example, some audio filters may amplify a particular frequency range and others may attenuate a particular frequency range. In some examples, the one or more second filters 308 from the set of second audio filters may modify bass, treble and/or middle sections of the audio signal A. In some examples, more than one second filter 308 from the set of second audio filters may be selected.

The audio processing unit 304 may be further configured to clear the history window 400 (shown in FIG. 4). The audio processing unit 304 may repeat the process of determining the state S of the breathing apparatus 300 by obtaining a new history window 400. The audio processing unit 304 may periodically clean the history window 400 from the memory.

Referring again to FIG. 3, the audio processing unit 304 is further configured to generate an output signal O based on the application of the first filter 306 or the second filter 308 on the audio signal A. The breathing apparatus 300 further includes an output device 310 receiving the output signal O from the audio processing unit 304. In some examples, the output device 310 may include a speaker. In some examples, the output device 310 may include multiple speakers. The audio signal A may, for example, be transmitted to an amplifier and/or a speaker to facilitate face-to-face communication by the user with others in the vicinity of the user.

In some examples, the breathing apparatus 300 may further include a wireless unit (not shown) configured to wirelessly transmit the output signal O from the audio processing unit 304 to the output device 310. For instance, the audio signal A may be transmitted for communication by the user to others remote from the user. Such a wireless unit may utilize a wireless communication interface, for example, Bluetooth®, or any other wireless network. As used herein, the phrase "wireless communication interface" refers to a system interface or a network interface between the breathing apparatus 300 and the output device 310 in a network, for example, a wireless radio network. Alternatively, the output signal O may be transmitted from the audio processing unit 304 to the output device 310 using a wired communication system.

In some examples, the wireless unit may be used to transmit the output signal O to a portable handheld device used for wireless communication between users. In such cases, the output device 310 may be part of the portable handheld device. For example, the wireless unit may transmit the output signal O to a two-way handheld radio transceiver, such as a walkie-talkie.

Figure 8:
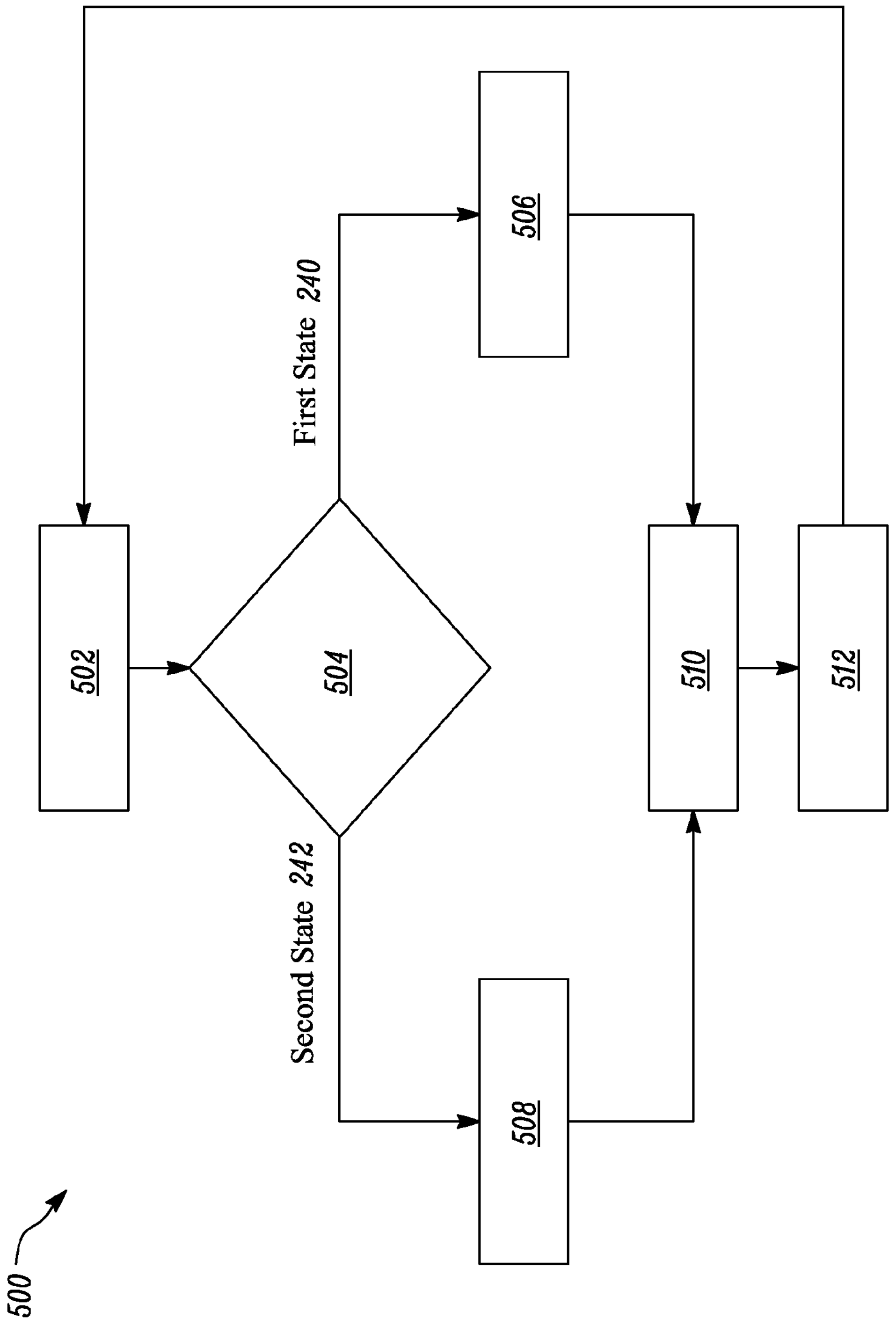
FIG. 8 is a flow chart illustrating a method of communicating using a breathing apparatus, in accordance with techniques of this disclosure.

FIG. 8 is a flow chart illustrating a method 500 of communicating using a breathing apparatus. The method 500 may be implemented using the breathing apparatus 300 described above. The breathing apparatus 300 may be similar to the breathing apparatus 100 of FIGS. 1 and 2A-2B and similar reference numbers are used to designate same or similar elements. In some examples, the breathing apparatus 300 may be a self-contained breathing apparatus (SCBA) or a powered air-purifying respirator (PAPR). Referring to FIGS. 1-8, at block 502, the method 500 includes receiving the audio signal A from the sound acquisition unit 302. In some examples, the sound acquisition unit 302 may include the microphone. In some examples, the sound acquisition unit 302 may further include the diaphragm coupled to the microphone.

At block 504, the method 500 further includes determining the state S of the breathing apparatus 300 based on the received audio signal A. The state S is at least one of the first state 240 and the second state 242. In some examples, the first state 240 may correspond to the purge-off state and the second state 242 may correspond to the purge-on state of the breathing apparatus 300. Further, in the purge-off state, the purge valve 230 of the breathing apparatus 300 may be closed. In the purge-on state, the purge valve 230 of the breathing apparatus 300 may be at least partially open. In some examples, the purge valve 230 may fluidly communicate the facepiece 102 of the breathing apparatus 300 with the ambient when the purge valve 230 is at least partially open.

In some examples, determining the state S of the breathing apparatus 300 may further include obtaining the audio signal A over the history window 400. The history window 400 may correspond to the first time period T1. In some examples, determining the state S of the breathing apparatus 300 may further include dividing the history window 400 into the plurality of time frames 402. Each time frame 402 may correspond to the second time period T2 less than the first time period T1. In some examples, determining the state S of the breathing apparatus 300 may further include comparing the amplitude AM of the audio signal A in the plurality of time frames 402 with the predetermined noise threshold 404. In some examples, determining the state S of the breathing apparatus 300 may further include determining the purge noise frame count N in the history window 400 corresponding to the number of time frames 402 in which the amplitude AM of the audio signal A exceeds the predetermined noise threshold 404.

In some examples, the method 500 may further include determining that the breathing apparatus 300 is in the purge-on state if the purge noise frame count N is greater than the predetermined purge count threshold N1. In some examples, the method 500 may further include determining that the breathing apparatus 300 is in the purge-off state if the purge noise frame count N is less than or equal to the predetermined purge count threshold N1.

Control moves to block 506 if the determined state S is the first state 240. Otherwise, control moves to block 508 if the determined state S is the second state 242.

At block 506, the method 500 further includes applying the first filter 306 on the audio signal A if the determined state S is the first state 240. In some examples, the first state 240 may correspond to the purge-off state. The first filter 306 has the first frequency response F1. The method 500 may further include selecting the first filter 306 from the set of first audio filters, for example, the first filters 306A, 306B, 306C, 306D. In some examples, the first frequency response F1 of the first filter 306 may be inverse of the frequency response F of the facepiece 102 of the breathing apparatus 300. In some examples, the first filter 306 may amplify frequencies within the boost frequency range. In some examples, the boost frequency range may be greater than about 1.5 kHz and less than about 3 kHz. In some examples, the first filter 306 may further attenuate frequencies less than about 1 kHz. In some other examples, the first filter 306 may further amplify frequencies less than about 1 kHz.

At block 508, the method 500 further includes applying the second filter 308 on the audio signal A if the determined state S is the second state 242. In some examples, the second state 242 may correspond to the purge-on state. The second filter 308 has the second frequency response F2 different from the first frequency response F1 of the first filter 306. In some examples, the method 500 may further include selecting the second filter 308 from the set of second audio filters. In some examples, the second filter 308 may be the low pass filter. In some examples, the second filter 308 may have the cut-off frequency CF of about 3 kHz.

Control moves to block 510 from either of blocks 506 or 508.

At block 510, the method 500 further includes generating the output signal O based on the application of the first filter 306 or the second filter 308 on the audio signal A. At block 512, the method 500 further includes receiving the output signal O at the output device 310. In some examples, the output device 310 may include the speaker. In some examples, the method 500 may further include wirelessly transmitting the output signal O to the output device 310.

The second state 242 may refer to purge-on state of the breathing apparatus 300 while the first state 240 may refer to purge-off state of the breathing apparatus 300. The second filter 308 may advantageously cut off a higher frequency range and may allow a lower frequency range to pass through. The purge noise, which typically falls in the higher frequency range, may then be suppressed while allowing speech transmission (which typically falls in the lower frequency range) to pass through the second filter 308. This may restrict purge noise from being transmitted in the output signal O to the output device 310 while allowing speech of a user to pass through.

In some examples, the method 500 may further include clearing the history window 400. The audio processing unit 304 may repeat the process by receiving the audio signal A again at block 502 and generating the output signal O to be received at the output device 310.

Figure 9:
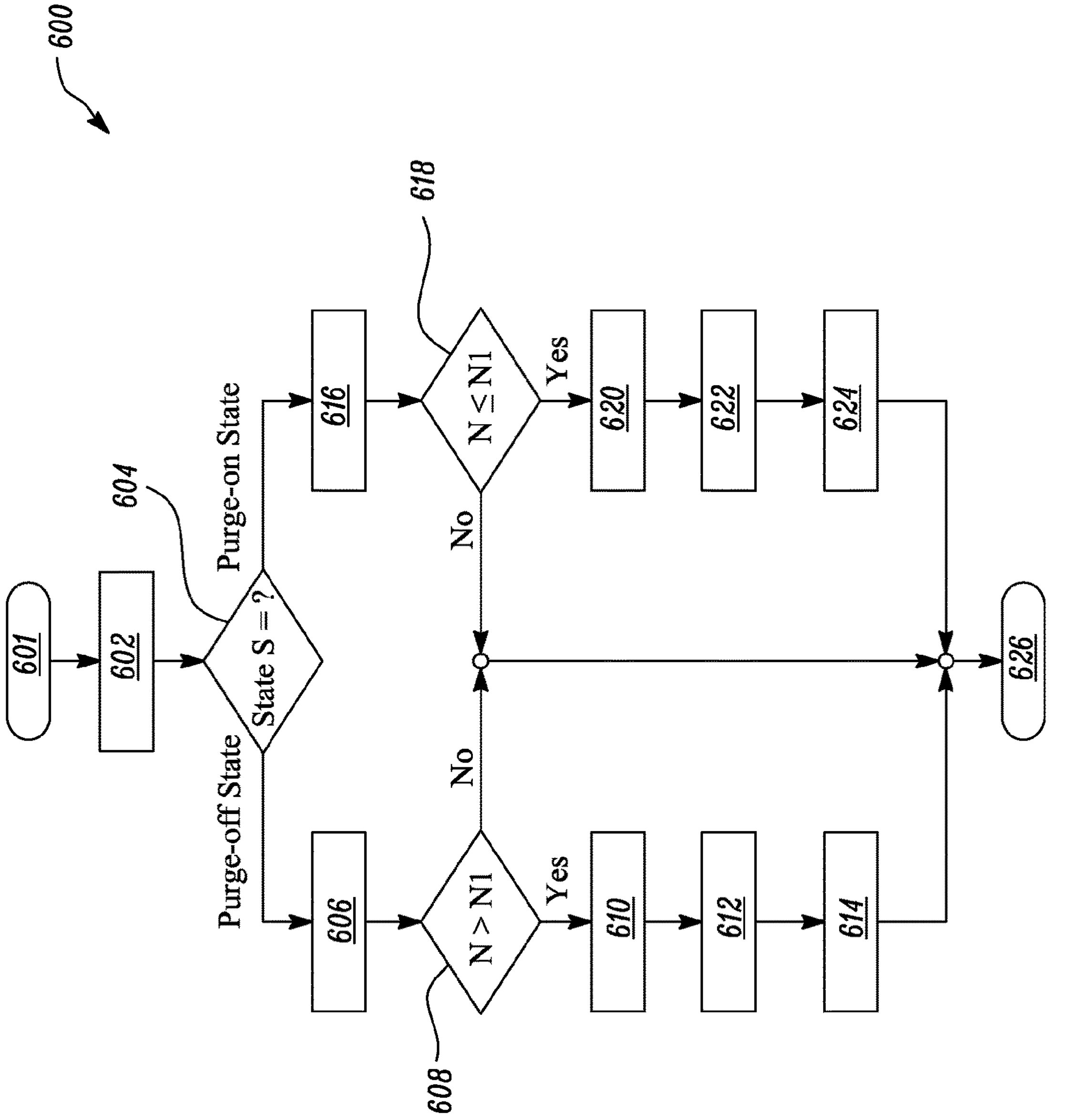
FIG. 9 is a flow chart illustrating a method of communicating using a breathing apparatus, in accordance with techniques of this disclosure.

FIG. 9 is a flow chart illustrating a method 600 of communicating using a breathing apparatus having a facepiece and a purge valve. The method 600 may be implemented using the breathing apparatus 300 described above. The breathing apparatus 300 may be similar to the breathing apparatus 100 of FIGS. 1 and 2A-2B and similar reference numbers are used to designate same or similar elements. Referring to FIGS. 1-7 and 9, the method 600 starts at block 601. Control moves to block 602 upon start. At block 602, the method 600 includes receiving the audio signal A from the sound acquisition unit 302. At block 604, the method 600 further includes determining the state S of the breathing apparatus 300. The state S is at least one of the purge-off state and the purge-on state. In the purge-off-state, the purge valve 230 is closed. In the purge-on state, the purge valve 230 is at least partially open. A default state of the breathing apparatus 300 is purge-off state and a default filter selected by the audio processing unit 304 is the first filter 306. The purge valve 230 fluidly communicates the facepiece 102 with the ambient when the purge valve 230 is at least partially open.

At block 604, control moves to block 606 if the breathing apparatus 300 is in the purge-off state. Otherwise, control moves to block 616 if the breathing apparatus 300 is in the purge-on state.

In some examples, determining the state S of the breathing apparatus 300 may further include obtaining the audio signal A over the history window 400. The history window 400 may correspond to the first time period T1. In some examples, determining the state S of the breathing apparatus 300 may further include dividing the history window 400 into the plurality of time frames 402. Each time frame 402 may correspond to the second time period T2 less than the first time period T1. In some examples, determining the state S of the breathing apparatus 300 may further include comparing the amplitude AM of the audio signal A in the plurality of time frames 402 with the predetermined noise threshold 404. In some examples, determining the state S of the breathing apparatus 300 may further include determining the purge noise frame count N, at block 606, in the history window 400 corresponding to the number of time frames 402 in which the amplitude AM of the audio signal A exceeds the predetermined noise threshold 404.

At block 608, the method 600 may further include determining that the breathing apparatus 300 is in the purge-on state if the purge noise frame count N is greater than the predetermined purge count threshold N1. If the purge noise frame count N is not greater than the predetermined purge count threshold N1, control may move to block 626. At block 626, control may return to block 602. In some cases, the method 600 may end at block 626 if the breathing apparatus 300 is deactivated.

Control moves to block 610 if the purge noise frame count N is greater than the predetermined purge count threshold N1. At block 610, the state S of the breathing apparatus 300 is set to purge-on state if the purge noise frame count N is greater than the predetermined purge count threshold N1. At block 612, the method 600 further includes applying the second filter 308 on the audio signal A if the determined state S is the purge-on state. The audio processing unit 304 may switch the default filter (e.g., the first filter 306) to the second filter 308. The second filter 308 has the second frequency response F2 different from the first frequency response F1 of the first filter 306. In some examples, the method 600 may further include selecting the second filter 308 from the set of second audio filters. At block 614, the method 600 may further include clearing the history window 400. Control moves to block 626 from block 614. At block 626, control may return to block 602. In some cases, the method 600 may end at block 626 if the breathing apparatus 300 is deactivated.

The method 600 may repeat the process by receiving the audio signal A from the sound acquisition unit 302 at block 602. In this case, the state S of the breathing apparatus 300 is now set to purge-on state. Hence, control may move to block 616 from block 604. The audio processing unit 304 may further determine the state S of the breathing apparatus 300 by obtaining the audio signal A over a new history window 400. The history window 400 may again be divided into the plurality of time frames 402. Further, the amplitude AM of the audio signal A in the plurality of time frames 402 may be compared with the predetermined noise threshold 404. The purge noise frame count N in the history window 400 may be determined, at block 616, corresponding to the number of time frames 402 in which the amplitude AM of the audio signal A exceeds the predetermined noise threshold 404.

At block 618, the method 600 may further include determining that the breathing apparatus 300 is in the purge-off state if the purge noise frame count N is less than or equal to the predetermined purge count threshold N1. If the purge noise frame count N is greater than the predetermined purge count threshold N1, control may move to block 626. At block 626, control may return to block 602. In some cases, the method 600 may end at block 626 if the breathing apparatus 300 is deactivated.

Control moves to block 620 if the purge noise frame count N is less than or equal to the predetermined purge count threshold N1. At block 620, the state S of the breathing apparatus 300 is set to purge-off state if the purge noise frame count N is less than or equal to the predetermined purge count threshold N1. At block 622, the method 600 further includes applying the first filter 306 on the audio signal A if the determined state S is the purge-off state. The audio processing unit 304 may switch the previously selected second filter 308 to the first filter 306. The first filter 306 has the first frequency response F1. In some examples, the method 600 may further include selecting the first filter 306 from the set of first audio filters, for example, the first filters 306A, 306B, 306C, 306D.

At block 624, the method 600 may further include clearing the history window 400. Control moves to block 626 from block 624. At block 626, control may return to block 602. The method 600 again repeats the process by receiving the audio signal A from the sound acquisition unit 302 at block 602. Now, the state S of the breathing apparatus 300 is set to purge-off state. In some cases, the method 600 may end at block 626 if the breathing apparatus 300 is deactivated.

The method 600 further includes generating the output signal O based on the application of the first filter 306 or the second filter 308 on the audio signal A. The method 600 further includes receiving the output signal O at the output device 310.

Figure 10:
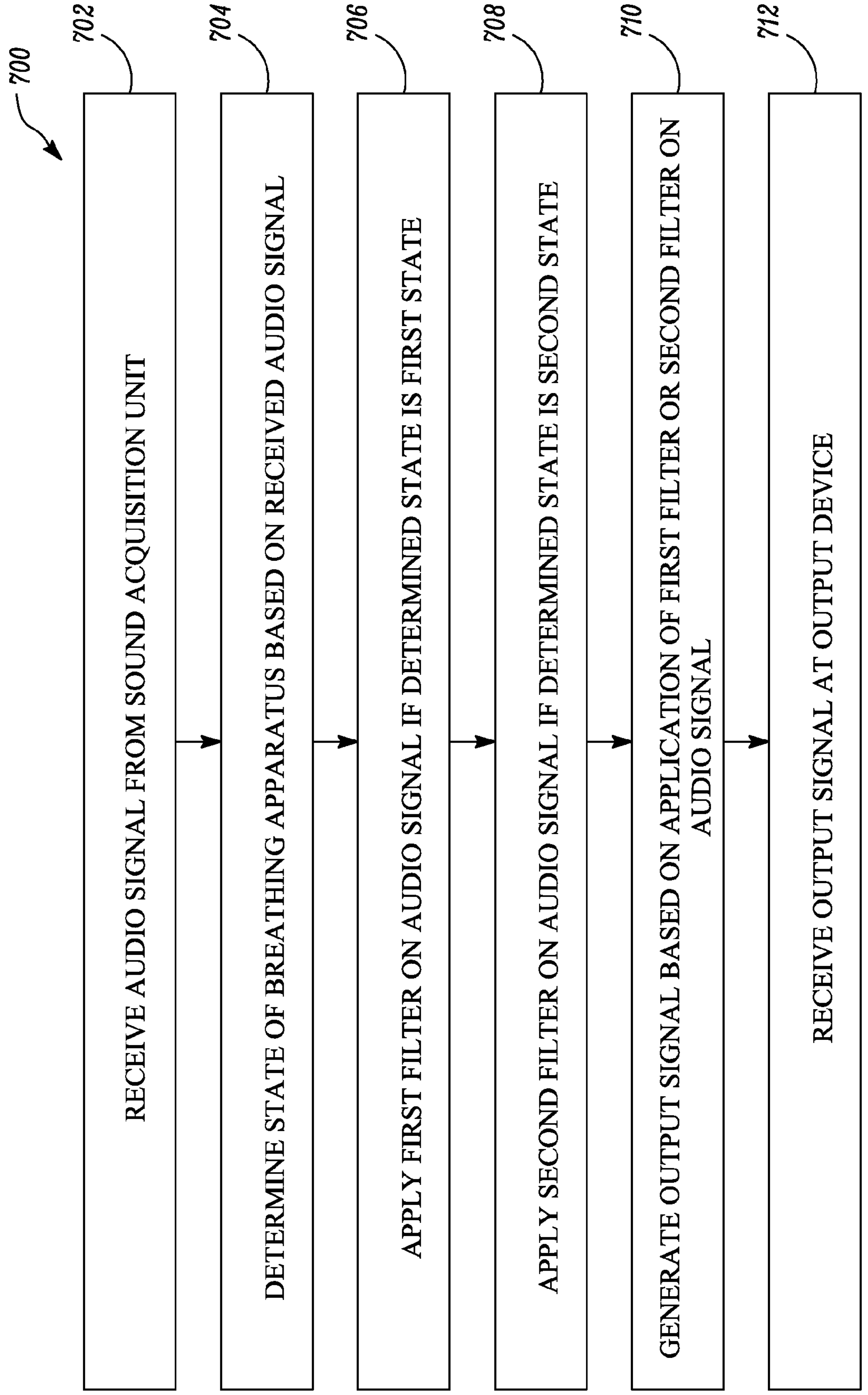
FIG. 10 is a flow chart illustrating a method of communicating using a breathing apparatus, in accordance with techniques of this disclosure.

FIG. 10 illustrates a method 700 of communicating using a breathing apparatus. The method 700 may be implemented using the breathing apparatus 300 described above. The breathing apparatus 300 may be similar to the breathing apparatus 100 of FIGS. 1 and 2A-2B and similar reference numbers are used to designate same or similar elements. In some examples, the breathing apparatus 300 may be a self-contained breathing apparatus (SCBA) or a powered air-purifying respirator (PAPR).

Referring to FIGS. 1-7 and 10, at step 702, the method 700 includes receiving the audio signal A from the sound acquisition unit 302. In some examples, the sound acquisition unit 302 may include a microphone. In some examples, the sound acquisition unit 302 may further include a diaphragm coupled to the microphone.

At step 704, method 700 further includes determining the state S of the breathing apparatus 300 based on the received audio signal A. The state S is at least one of the first state 240 and the second state 242. In some examples, the first state 240 may correspond to the purge-off state and the second state 242 may correspond to the purge-on state of the breathing apparatus 300. In some examples, in the purge-off state, the purge valve 230 of the breathing apparatus 300 may be closed, and whereas, in the purge-on state, the purge valve 230 of the breathing apparatus 300 may be at least partially open. In some examples, the purge valve 230 may fluidly communicate a facepiece 102 of the breathing apparatus 300 with an ambient when the purge valve 230 is at least partially open.

In some examples, determining the state S of the breathing apparatus 300 may further include obtaining the audio signal A over the history window 400. In some examples, the history window 400 may correspond to the first time period T1. In some example, determining the state S of the breathing apparatus 300 may further include dividing the history window 400 into the plurality of time frames 402. In some examples, each time frame 402 may correspond to the second time period T2 less than the first time period T1. In some examples, determining the state S of the breathing apparatus 300 may further include comparing the amplitude AM of the audio signal A in the plurality of time frames 402 with the predetermined noise threshold 404. In some examples, determining the state S of the breathing apparatus 300 may further include determining the purge noise frame count N in the history window 400 corresponding to a number of the time frames 402 in which the amplitude AM of the audio signal A exceeds the predetermined noise threshold 404.

In some examples, the method 700 may further include determining that the breathing apparatus 300 is in the purge-on state if the purge noise frame count N is greater than the predetermined purge count threshold N1. In some examples, the method 700 may further include determining that the breathing apparatus 300 is in the purge-off state if the purge noise frame count N is less than or equal to the predetermined purge count threshold N1. In some examples, the method 700 may further include clearing the history window 400.

At step 706, the method 700 further includes applying the first filter 306 on the audio signal A if the determined state S is the first state 240. The first filter 306 has the first frequency response F1. In some examples, the first frequency response F1 of the first filter 306 may be inverse of the frequency response F of the facepiece 102 of the breathing apparatus 300. In some examples, the first filter 306 may amplify frequencies within a boost frequency range. In some examples, the boost frequency range may be greater than about 1.5 kHz and less than about 3 kHz. In some examples, the first filter 306 may further attenuate frequencies less than about 1 kHz. In some other examples, the first filter 306 may further amplify frequencies less than about 1 kHz. In some examples, the method 700 may further include selecting the first filter 306 from the set of first audio filters, for example, the first filters 306A, 306B, 306C, 306D.

At step 708, the method 700 further includes applying the second filter 308 on the audio signal A if the determined state S is the second state 242. The second filter 308 has the second frequency response F2 different from the first frequency response F1 of the first filter 306. In some examples, the second filter 308 may be a low pass filter. In some examples, the second filter 308 may have the cut-off frequency CF of about 3 kHz. In some examples, the method may further include selecting the second filter 308 from a set of second audio filters.

At step 710, the method 700 further includes generating the output signal O based on the application of the first filter 306 or the second filter 308 on the audio signal A. At step 712, the method 700 further includes receiving the output signal O at the output device 310. In some examples, the method 700 may further include wirelessly transmitting the output signal O to the output device 310. In some examples, the output device 310 may include a speaker.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A method of communicating using a breathing apparatus, the method comprising:

receiving an audio signal from a sound acquisition unit;

determining a state of the breathing apparatus based on the received audio signal, wherein the state is at least one of a first state and a second state;

applying a first filter on the audio signal if the determined state is the first state, wherein the first filter has a first frequency response;

applying a second filter on the audio signal if the determined state is the second state, wherein the second filter has a second frequency response different from the first frequency response of the first filter;

generating an output signal based on the application of the first filter or the second filter on the audio signal; and a second computing device communicatively coupled to the article of PPE and comprising a second computer processor and a second memory;

receiving the output signal at an output device;

wherein the first state corresponds to a purge-off state and the second state corresponds to a purge-on state of the breathing apparatus.

2. The method of claim 1, wherein, in the purge-off state, a purge valve of the breathing apparatus is closed, wherein, in the purge-on state, the purge valve of the breathing apparatus is at least partially open, and wherein the purge valve fluidly communicates a facepiece of the breathing apparatus with an ambient when the purge valve is at least partially open.

3. The method of claim 1, wherein determining the state of the breathing apparatus further comprises:

obtaining the audio signal over a history window, the history window corresponding to a first time period;

dividing the history window into a plurality of time frames, each time frame corresponding to a second time period less than the first time period;

comparing an amplitude of the audio signal in the plurality of time frames with a predetermined noise threshold; and determining a purge noise frame count in the history window corresponding to a number of time frames in which the amplitude of the audio signal exceeds the predetermined noise threshold.

4. The method of claim 1, further comprising selecting the first filter from a set of first audio filters.

5. The method of claim 1, further comprising selecting the second filter from a set of second audio filters.

6. The method of claim 1, wherein the first frequency response of the first filter is inverse of a frequency response of a facepiece of the breathing apparatus.

7. The method of claim 1, wherein the first filter amplifies frequencies within a boost frequency range.

8. The method of claim 1, wherein the breathing apparatus is a self-contained breathing apparatus (SCBA) or a powered air-purifying respirator (PAPR).

9. A breathing apparatus comprising:

a facepiece comprises a sound acquisition unit configured to generate an audio signal in response to a sound inside the facepiece;

an audio processing unit configured to receive the audio signal from the sound acquisition unit, the audio processing unit configured to:

determine a state of the breathing apparatus based on the received audio signal, wherein the state is at least one of a first state and a second state;

apply a first filter on the audio signal if the determined state is the first state, wherein the first filter has a first frequency response;

apply a second filter on the audio signal if the determined state is the second state, wherein the second filter has a second frequency response different from the first frequency response of the first filter;

generate an output signal based on the application of the first filter or the second filter on the audio signal; and an output device receiving the output signal from the audio processing unit;

a regulator mounted on the facepiece, the regulator comprising a purge valve that fluidly communicates the facepiece with an ambient when the purge valve is at least partially open, wherein the first state corresponds to a purge-off state when the purge valve is closed and the second state corresponds to a purge-on state when the purge valve is at least partially open.

10. The breathing apparatus of claim 9, wherein the audio processing unit is further configured to:

obtain the audio signal over a history window, the history window corresponding to a first time period;

divide the history window into a plurality of time frames, each time frame corresponding to a second time period less than the first time period;

compare an amplitude of the audio signal in the plurality of time frames with a predetermined noise threshold; and determine a purge noise frame count in the history window corresponding to a number of time frames in which the amplitude of the audio signal exceeds the predetermined noise threshold.

11. The breathing apparatus of claim 9, wherein the audio processing unit is further configured to select the first filter from a set of first audio filters.

12. The breathing apparatus of claim 9, wherein the audio processing unit is further configured to select the second filter from a set of second audio filters.

13. The breathing apparatus of claim 9, wherein the first frequency response of the first filter is inverse of a frequency response of the facepiece.

14. The breathing apparatus of claim 9, wherein the first filter amplifies frequencies within a boost frequency range.

15. The breathing apparatus of claim 9, further comprising a wireless unit configured to wirelessly transmit the output signal from the audio processing unit to the output device.

16. The breathing apparatus of claim 9, wherein the breathing apparatus is a self-contained breathing apparatus (SCBA) or a powered air-purifying respirator (PAPR).

17. A method of communicating using a breathing apparatus having a facepiece and a purge valve, the method comprising:

receiving an audio signal from a sound acquisition unit;

determining a state of the breathing apparatus based on the received audio signal, wherein the state is at least one of a purge-off state and a purge-on state, wherein, in the purge-off-state, the purge valve is closed, and wherein, in the purge-on state, the purge valve is at least partially open, the purge valve fluidly communicating the facepiece with an ambient when the purge valve is at least partially open;

applying a first filter on the audio signal if the determined state is the purge-off state, wherein the first filter has a first frequency response;

applying a second filter on the audio signal if the determined state is the purge-on state, wherein the second filter has a second frequency response different from the first frequency response of the first filter;

generating an output signal based on the application of the first filter or the second filter on the audio signal; and receiving the output signal at an output device.

18. The method of claim 17, wherein determining the state of the breathing apparatus further comprises:

obtaining the audio signal over a history window, the history window corresponding to a first time period;

dividing the history window into a plurality of time frames, each time frame corresponding to a second time period less than the first time period;

comparing an amplitude of the audio signal in the plurality of time frames with a predetermined noise threshold; and determining a purge noise frame count in the history window corresponding to a number of time frames in which the amplitude of the audio signal exceeds the predetermined noise threshold.

* * * * *